United States Patent
Howerton

(10) Patent No.: US 11,516,002 B1
(45) Date of Patent: Nov. 29, 2022

(54) TRACKING HISTORY OF A DIGITAL OBJECT USING A CRYPTOGRAPHIC CHAIN

(71) Applicant: Regscale, Tysons, VA (US)

(72) Inventor: Jared Travis Howerton, Oak Ridge, TN (US)

(73) Assignee: Regscale, Tysons, VA (US)

( * ) Notice: Subject to any disclaimer, the term of this patent is extended or adjusted under 35 U.S.C. 154(b) by 0 days.

(21) Appl. No.: 17/702,945

(22) Filed: Mar. 24, 2022

(51) Int. Cl.
*H04L 9/06* (2006.01)
*H04L 9/00* (2022.01)

(52) U.S. Cl.
CPC .............. *H04L 9/0643* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2016/0234011 A1* | 8/2016 | Bruno | G06F 21/62 |
| 2020/0050696 A1* | 2/2020 | Mowatt | G06F 40/166 |
| 2022/0029785 A1* | 1/2022 | Miller | H04L 9/0643 |
| 2022/0051192 A1* | 2/2022 | Cheng-Shorland | G06F 16/93 |

FOREIGN PATENT DOCUMENTS

CN 108768663 * 5/2018

* cited by examiner

*Primary Examiner* — Taghi T Arani
*Assistant Examiner* — Joshua Raymond White
(74) *Attorney, Agent, or Firm* — Shumaker, Loop & Kendrick, LLP

(57) ABSTRACT

A system and a method for tracking history of a digital object using cryptographic chain. The digital object is encrypted using a cryptographic technique to form a first time travel record of a cryptographic chain. Further, an update in the digital object is detected. Furthermore, an updated digital object is encrypted to form a second time travel record. The first time travel record and the second time travel record are linked to form the cryptographic chain through a composite key. Subsequently, an input from the user is received to identify a change in the digital object. The cryptographic chain is sequentially decrypted based on the input. Finally, a change in the digital object is identified based on a comparison of the first time travel record and the second time travel record, thereby tracking history of the digital object using the cryptographic chain.

13 Claims, 5 Drawing Sheets

TRACKING HISTORY OF A DIGITAL OBJECT USING A CRYPTOGRAPHIC CHAIN

PRIORITY INFORMATION

The present application does not claim a priority from any other application.

TECHNICAL FIELD

The present subject matter described herein, in general, relates to a system and a method for tracking history of a digital object using a cryptographic chain. More particularly, tracking history of a digital object using a cryptographic chain.

BACKGROUND

A compliance audit is a comprehensive review of an organization's adherence to regulatory guidelines. In the compliance audit, each and every word of a compliance document is checked. If any offense is captured in the compliance audit, the organization may have to pay a penalty. In some cases, the penalty may be calculated from the date of a last audit in the organization if not other evidence exists of when the offense first occurred. In such case, the organization may want to provide actual the date of the offense that might reduce the penalty. However, the organization may fail to track and identify the actual date of each change or lack the integrity controls which would ensure the record has not been altered in any way.

Further, during the course of the compliance audit, the auditor has to go through each compliance document to identify the what has changed and any potential areas for non-compliance. Hence, a user may want to check the exact state of the compliance package/artifacts in past to determine precisely what changed to better focus on the audit versus wasting time reviewing requirements or controls that have already been assessed and found to be fully compliant. However, in most cases, the user has to manually check the changes to the state of the compliance in static Microsoft Word and Excel documents where it is not easy to determine the precise change (especially across documents) and will have difficulty ensuring the integrity of the changes as to when each change occurred, by who, and the exact change. Consequently, the user will most often fail to accurately identify the changes in the compliance resulting in the need for manual checking and data calls that are both time consuming and error prone processes.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for tracking history of a digital object using a cryptographic chain. This summary is not intended to identify essential features of the claimed subject matter nor is it intended for use in determining or limiting the scope of the claimed subject matter.

In one implementation, a method for tracking history of a digital object using a cryptographic chain is disclosed. Initially, a digital object may be generated for unstructured data or structured data received from a user on a platform. Further, the digital object may be encrypted using a cryptographic technique to form a first time travel record of a cryptographic chain. In one aspect, the time travel record may comprise encrypted data, user information and a timestamp of the digital object. The cryptographic chain may comprise a plurality of versions associated with the digital object. Furthermore, an update in the digital object may be detected. In one aspect, the update may be detected in real-time. Subsequently, an updated digital object may be encrypted to form a second time travel record. In one aspect, the encryption may be based on a composite key. The composite key may be dependent on a private key and a hash of a preceding record. The second time travel record may comprise encrypted data, user information and a timestamp of the updated digital object. The first time travel record and the second time travel record may be linked to form the cryptographic chain. In one aspect, the cryptographic chain may indicate history of updates associated to the digital object. Further, an input from the user may be received to identify a change in the digital object. In one aspect, the input may be received to decrypt the cryptographic chain. Subsequently, the cryptographic chain may be sequentially decrypted based on the input. In one aspect, each time travel record may be present in the cryptographic chain is decrypted using the composite key. Finally, the change in the digital object may be identified based on a comparison of the first time travel record and the second time travel record, thereby tracking history of the digital object using the cryptographic chain. In one aspect, the aforementioned method for tracking history of a digital object using a cryptographic chain may be performed by a processor using programmed instructions stored in a memory.

In another implementation, a non-transitory computer program product having embodied thereon a computer program for tracking history of a digital object using a cryptographic chain is disclosed. The program may comprise a program code for generating a digital object for unstructured data or structured data received from a user on a platform. Further, the program may comprise a program code for encrypting the digital object using a cryptographic technique to form a first time travel record of a cryptographic chain. In one aspect, the time travel record may comprise encrypted data, user information and a timestamp of the digital object. The cryptographic chain may comprise a plurality of versions associated with the digital object. Furthermore, the program may comprise a program code for detecting an update in the digital object. In one aspect, the update may be detected in real-time. The program may further comprise encrypting an updated digital object to form a second time travel record. In one aspect, the encryption may be based on a composite key. The composite key may be dependent on a private key and a hash of a preceding record. The second time travel record may comprise encrypted data, user information and a timestamp of the updated digital object. Subsequently, the program may comprise a program code for linking the first time travel record and the second time travel record to form the cryptographic chain. The cryptographic chain may indicate history of updates associated to the digital object. The program may further comprise a program code for receiving an input from the user to identify a change in the digital object. In one aspect, the input may be received to decrypt the cryptographic chain. Further, the program may comprise a program code for sequentially decrypting the cryptographic chain based on the input. In one aspect, each time travel record present in the cryptographic chain may be decrypted using the composite key. Finally, the program may comprise a program code for identifying the change in the digital object based on a comparison of the first time travel record and the second time travel record, thereby tracking history of the digital object using the cryptographic chain.

BRIEF DESCRIPTION OF THE DRAWINGS

The foregoing detailed description of embodiments is better understood when read in conjunction with the appended drawings. For the purpose of illustrating the present subject matter, an example is provided as figures, however, the invention is not limited to the specific method and system for tracking history of a digital object using a cryptographic chain as disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

Figure 1:
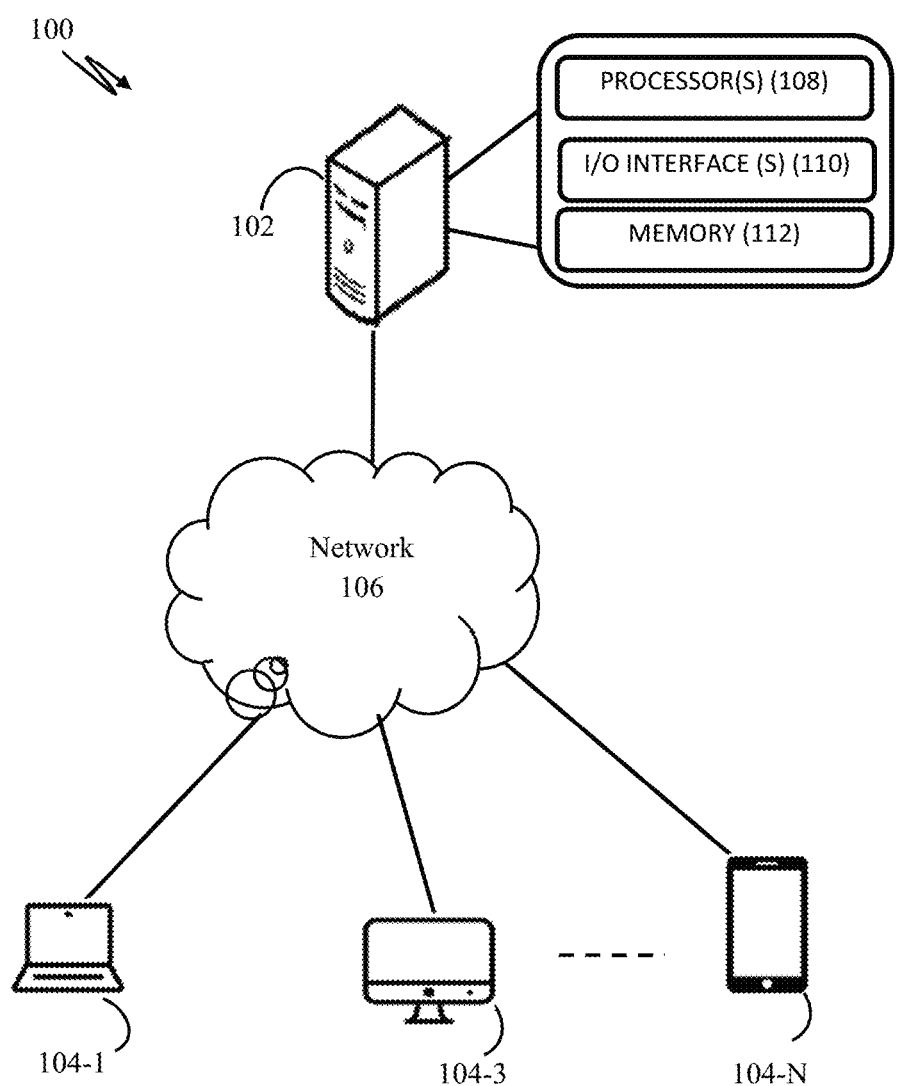
FIG. 1 illustrates a network implementation of a system for tracking history of a digital object using a cryptographic chain is disclosed, in accordance with an embodiment of the present subject matter.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "generating", "encrypting," "detecting," "linking," "receiving," "decrypting," "identifying," and other forms thereof, are intended to be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described, but is to be accorded the widest scope consistent with the principles and features described herein.

The present subject matter discloses a system and a method for tracking history of a digital object using a cryptographic chain. Typically, it is difficult or impossible for a user to detect the exact time and change that would cause an audit to fail. Also, the user may not be able to identify the changes done since last audit resulting in "over-scoping" and wasted effort to re-audit known good states. More importantly, the present invention discloses an automatic process for tracking the history of the digital object in the cryptographic chain. The present invention tracks the history of the digital object using the cryptographic chains with high integrity and confidentiality. Initially, a digital object for unstructured data may be generated. Further, a first time travel record for the digital object may be generated. Subsequently, an update may be detected in the digital object. Furthermore, a second time travel record for an updated digital object may be generated. The first time travel record and the second time travel record may be further used to identify a change in the digital object while ensuring that the first time travel record or the second time travel record has not been altered in any way due to a hashing technique and a linking algorithm.

While aspects of the described system and method for tracking history of a digital object using a cryptographic chain may be implemented in any number of different computing systems, environments, and/or configurations, the embodiments are described in the context of the following exemplary system.

Referring now to FIG. 1, a network implementation 100 of a system 102 for tracking history of a digital object using a cryptographic chain is disclosed. It may be noted that one or more users may access the system 102 through one or more user devices 104-1, 104-2 . . . 104-N, collectively referred to as user devices 104, hereinafter, or applications residing on the user devices 104. In one aspect, the one or more users may comprise variety of different roles/personas in the system. Each roles may have different permissions and access control.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106 which may be either physical or software-defined in nature.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, Application Programming Interface (API), Command Line Interface (CLI), and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or nonvolatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for tracking history of a digital object using a cryptographic chain. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter describes the system 102 for tracking history of a digital object using a cryptographic chain. The system 102 may track the history of the digital object in real-time. The history may be tracked based on a time travel record of an update in the digital object. The history of the digital object may be referred as a detailed revision of the digital object. In order to track the history, initially, the system 102 may receive unstructured or structured data from a user on a platform. The unstructured data may be received from one of a word document, an excel document, a PDF document and a website. The structured data may be received in a Javascript Object Notation (JSON) format. In one aspect, the JSON format may be encrypted and hashed with records to the related unstructured data.

Once the unstructured data is received, the system 102 may generate a digital object for the unstructured data or the structured data. In one aspect, the unstructured data or the structured data may be represented as a collection of digital objects wrapped in hundreds of APIs for interaction with an outside world. The digital object may interact with the outside world through scanners, continuous monitoring tools, document updates, manual or automated audits/assessments, corrective actions, exceptions, asset changes such as retiring systems and adding new ones, patching and the like.

In one aspect, digitization of the Word document and the Excel document from a monolithic and static document to a real-time digital suite of objects allows for more discrete and real-time tracking of changes, ensuring the documents do not become outdated.

Further, the system 102 may convert the digital object into a predefined format. The predefined format may be one of, but not limited to, a JSON format, an HTML format, a YAML format, and an XML format. In one aspect, the digital object may be converted into a string format for encryption and hashing. The digital object may be reconstituted for a bit-wise comparison between versions and after decrypting the string.

Furthermore, the system 102 may encrypt the digital object using a cryptographic technique. The cryptographic technique may comprise Advanced Encryption Standard-256 (AES-256) technique. Based on the encryption, the system 102 may create encrypted data associated with the digital object. In one aspect, the cryptographic technique may comprise a symmetric encryption technique. In one embodiment, a primary constraint may be that the technique must use a private key that is symmetric to allow an efficient encryption and decryption by a back-end processor of the system 102.

Upon encryption, the system 102 may take a snapshot of the encrypted digital object. Upon taking the snapshot, the system 102 may form a first time travel record of the cryptographic chain. The first time travel record may be formed while obtaining a one way cryptographic hash which is typically performed using a hashing technique. In one aspect, the cryptographic chain may comprise a plurality of versions associated with the digital object. The plurality of versions may be represented as additional links on the cryptographic chain. The first time travel record may comprise encrypted data associated with the digital object, user information and a timestamp of the digital object. In one aspect, the user information may comprise a name of the user. The timestamp of the digital object may comprise date, day and time of the digital object. In one embodiment, the timestamp may be used to ensure that the first time travel record is decrypted in chronological order using a hash as the other part of the composite key along with the private key for the AES encryption.

Based on the encryption, the system 102 may create a first hash for the digital object using a hashing technique. In one aspect, the first has may be created for the encrypted digital object. In one aspect, the hashing technique may comprise Message Digest Algorithm 5 (MD5) hashing technique. In one embodiment, the system 102 may use one way hashing technique. The first hash may be created by "stringifying" the digital object and related data, running the string through an AES-256 encryption technique using the private key and a hash of a preceding record, and then hashing the encrypted string using MD-5 hashing. The system 102 may ensure that the data packets are encrypted, and can only be decrypted in sequence, and that no changes to the data have been made ensuring high integrity.

In one embodiment, the hashing technique may be a cryptographic process used to validate the authenticity and integrity of various types of input. Further, the MD5 hashing technique may be a cryptographic hash algorithm used to create a 128-bit string value from an arbitrary length string. The MD5 hashing technique may be used to verify the integrity of files. In one aspect, the hashing may be critical as to be audit defensible, the user must be able to prove when the change occurred, who performed the change, and ensure that the record has not been altered. In another aspect, if the record could have been altered, then it may be unlikely to be viewed as an evidence of when the non-compliance first occurred.

Subsequently, the system 102 may detect an update in the digital object. The update may be detected in real-time. In one aspect, the update may be detected as changes occur whether programmatically through Application Programming Interfaces (APIs) or through manual edits and traditional Create, Read, Update, and Delete (CRUD) methods in a Graphical User Interface (GUI). The update may indicate changes or edits in the digital object. Based on the update, an updated digital object may be generated. The updated digital object may be referred as a new digital object. In one aspect, the update may be a manual update or an automated update via an Application Programming Interface (API) or a machine to machine interaction. The manual update or the automated update may be received in an audit. may Once the update is detected, the system 102 may record an updated format of the updated digital object. The updated format may be one of, but not limited to, a JSON format, an HTML format, a YAML format, and an XML format. In one aspect, the updated digital object may be converted into the updated format. The updated format may be "stringified" and further stored to encrypt, and hash each version of the record.

Further, the system 102 may encrypt the updated digital object. The updated digital object may be encrypted using the cryptographic technique. Based on the encryption, the system 102 may create encrypted data associated with the updated digital object. The cryptographic technique may comprise Advanced Encryption Standard-256 (AES-256) technique. The cryptographic technique may be an encryption technique that uses a symmetric key. In one aspect, the encryption of the updated digital object may be based on a composite key. The composite key may be dependent on a private key of a preceding record and a hash of a preceding record. In one aspect, the composite key of the updated digital object may be generated based on the private key of the digital object and the first hash. In one example, composite key of a third updated digital object may be dependent on the private key and the hash of the second updated digital object. The process may continue "to the n" in order to support unlimited updates and new records on the cryptographic chain. The cryptographic chain may be referred as a time travel chain.

Upon encryption, the system 102 may take a snapshot of the updated digital object that is encrypted. Based on the snapshot, the system 102 may form a second time travel record of the cryptographic chain. The second time travel record may comprise encrypted data of the updated digital object, a hash key, user metadata, user information and a timestamp of the updated digital object. In one aspect, the user information may comprise a name of the user who has edited or updated the digital object. The timestamp of the digital object may comprise date, day and time of the updated digital object.

Based on the encryption, the system 102 may create an updated hash for the updated digital object using a hashing technique. The updated hash may be created based on the encryption of the updated digital object. In one aspect, the hashing technique may comprise the MD5 hashing technique.

Further, the system 102 may link the first time travel record and the second time travel record. Based on the linking, the system 102 may form the cryptographic chain. In one aspect, the cryptographic chain may indicate history of updates associated to the digital object. The cryptographic chain may be decrypted in sequential order based on the time stamp for the composite key decryption to work properly. The cryptographic chain may represent multiple versions of the digital object over time in an encrypted and linked chain. The cryptographic chain may comprise a plurality of versions associated with the digital object. The plurality of versions may comprise a time travel record for the digital object and the updated digital objects. In other words, the cryptographic chain may comprise a plurality of time travel records. In one example, each time travel record may be represented as a link on the cryptographic chain.

In one example, consider the initial save as the first time travel record of the digital object, a first edit as the second time travel record of the updated digital object, and the sequence may continue "to the n" number of links on the time travel chain as edits occur. Further, the first time travel record, the second time travel record and t the "to the n" number of time travel records may be sequentially linked to form the cryptographic chain.

Subsequently, the system 102 may receive an input from the user. The input may be received to request to review a change in the digital object. In one aspect, the input may be received to decrypt the cryptographic chain to allow viewing of the change. Upon receiving the input, the system 102 may reverse encrypt each record on the cryptographic chain to decrypt the cryptographic chain. The description must be done in order of the records due to the nature of the composite key. In one embodiment, the input may be a click on a version from the plurality of versions of the digital object. In the embodiment, the input may correspond to the click on a record from the time travels records in the cryptographic chain. The record may be referred to as the selected record or a requested record.

Further, the system 102 may generate a new hash for the selected record upon receiving the input. In one aspect, the new hash may be generated for encrypted string upon the user selecting the record. The new hash may be compared with a previous hash of the selected record. In one aspect, the comparison may be configured to check integrity of data associated with the updated digital object. The comparison may help to ensure that the data is not altered. In one embodiment, the system 102 may verify that the hashes match as part of the integrity check and will alert the user if the record has been altered or tampered with in any way.

Upon the matching comparison of the new hash and the updated hash, the selected record may be decrypted. The decryption may be a sequential decryption of each time travel record present in the cryptographic chain. The decryption may be performed using the composite key of each updated digital object. Each updated digital object may be decrypted in reverse chronological order until reaching the requested record in the cryptographic chain. Further, the system 102 may decrypt the encrypted data using the composite key that is a combination of the symmetric private key plus the hash of the preceding record in order to return a human readable version of the digital object from the system 102. Each time travel record present in the cryptographic chain may be decrypted using the composite key providing high integrity due to the hashing technique which ensures nothing can be changed without breaking the decryption.

In one aspect, a cryptography and the hashing may ensure the integrity of each version in the cryptographic chain which ensure that the data is not altered and that chronology cannot be changed within the cryptographic chain. The cryptography and hashing may provide strong integrity controls and confidence in sequencing of versions of the digital object.

Subsequently, the system 102 identify the change in the digital object. The change may be identified based on an unencrypted field-level comparison of the first time travel record and the second time travel record. The change may be displayed to the user in multiple tabs to easily visualize precise changes. The multiple tabs may comprise a before change tab and a after change tab. In one aspect, the before change tab may show data of the digital object from that point in time in the cryptographic chain sequence. The after change tab may show the data of the updated digital object at a present time. In one embodiment, the before change tab and the after change tab may show discrete changes between different versions of the digital object to know precisely which fields on the digital object have changed since that point in time and what the values were before and after the change.

In one embodiment, the system 102 may comprises time travelling from the timestamp of the first time travel record to the time stamp of the updated time travel record. The system 102 may visualize all discrete events and underlying changes along the digital object continuum from its first save to its final edit.

In one aspect, the system 102 may provide a git-like level for tracking changes within the digital object. The git-like level may help to see exactly what the record was before the change and after the change using structured data on a per field level. the git-like level may streamlines the user's job by helping the user understand precisely what is different since the last time the digital object or the updated digital object was evaluated.

In one exemplary embodiment, an environmental regulator may note that control setting for monitoring mercury levels in a creek behind a manufacturing plant is set to a wrong value. It may be an offense that results in a large day for day fine for every day they were out of compliance. If they cannot prove the date it was changed, the fine will go back to the last audit which may have been a long time ago resulting in a hefty fine. In this case, the system 102 of the present invention may be able to see exactly when this control changed, the date it occurred, who did it, and what the value was before and after. Further, the system 102 may prove the record was not altered or the chronology hasn't changed since it would be unable to decrypt as each record is hashed and signed. The system 102 may provide high cryptographic assurance to an auditor of data integrity allowing the fine to be reduced to that precise point in time where the offense occurred.

In another exemplary embodiment, a federal approver needs to certify a cyber security package for a contractor system. The contractor system may have been approved 6 months ago. The federal approver may want to look at what has changed to avoid having to read and approve the full package which could be hundreds of pages. Using the system 102, the federal approver may be able to see every edit to every object in the package while not having to review the entire system saving significant time and money.

In one embodiment, the system 102 may create a digitization engine to make the unstructured data machine readable. The system 102 may further combine multiple disparate technologies such as hashing, cryptography, linked lists, and version control. In one aspect, the digitization engine may convert and import legacy formats into a digital object. The system 102 may be a secure ledger technology that adds integrity and encryption features. In one aspect, the system 102 may adopt the technology to seamlessly plug into compliance business processes in a way that adds business value and is largely invisible to an end user as a behind the scenes encrypted and high integrity version control system. The system 102 may leverage multiple commercial and open technologies into a new end to end business process to provide high assurance of the compliance processes.

Figure 2:
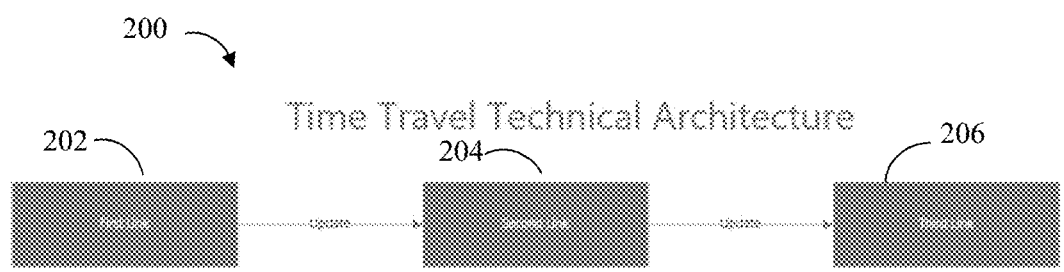
FIG. 2 illustrates a cryptographic chain of a time travel architecture, in accordance with an embodiment of the present subject matter.

Referring now to FIG. 2, a cryptographic chain of a time travel architecture is disclosed in accordance with an embodiment of the present subject matter. In one embodiment, the cryptographic chain 200 may comprise a first link 202, a second link 204 and a third link 206. The first link 202 may indicate the first time travel record. The second link 204 may indicate the second time travel record. The third link 206 may indicate the third time travel record.

In one embodiment, the first time travel record 202 may be associated with the digital object. The first time travel record 202 may comprise the encrypted data, day, date, time and the user information related to the digital object. Further, the update may be detected in the digital object. Based on the update, the second time travel record 204 may be generated for the updated digital object. The first time travel record 202 and the second time travel record 204 may be linked cryptographically by hash codes. Furthermore, the update may be detected in the second digital object. Based on the update, the third time travel record 206 may be generated. The third time travel record 206 may be linked with the second time travel record 204. The process may continue in perpetuity to capture all updates to the digital object over time.

Figure 3:
FIG. 3 illustrates a snapshot of a time travel record, in accordance with an embodiment of the present subject matter.

Referring now to FIG. 3, a snapshot 300 of a time travel record is disclosed in accordance with an embodiment of the present subject matter. In one embodiment, the second time travel record 302 and the third time travel record 304 may be shown. The second time travel record 302 may comprise the date of update as Aug. 6, 2021, the time of update as 4:34:26 PM, the updated hash as 2951094 . . . DB13 and the user who has updated the digital object as Howerton, Travis. The third time travel record 304 may comprise the date of update as Jan. 25, 2021, the time of update as 10:42:43 PM, the updated hash as 5EDAE . . . 9BE8 and the user who has updated the digital object as Howerton, Travis. Each of these records may be a unique link on the cryptographic chain.

Figure 4:
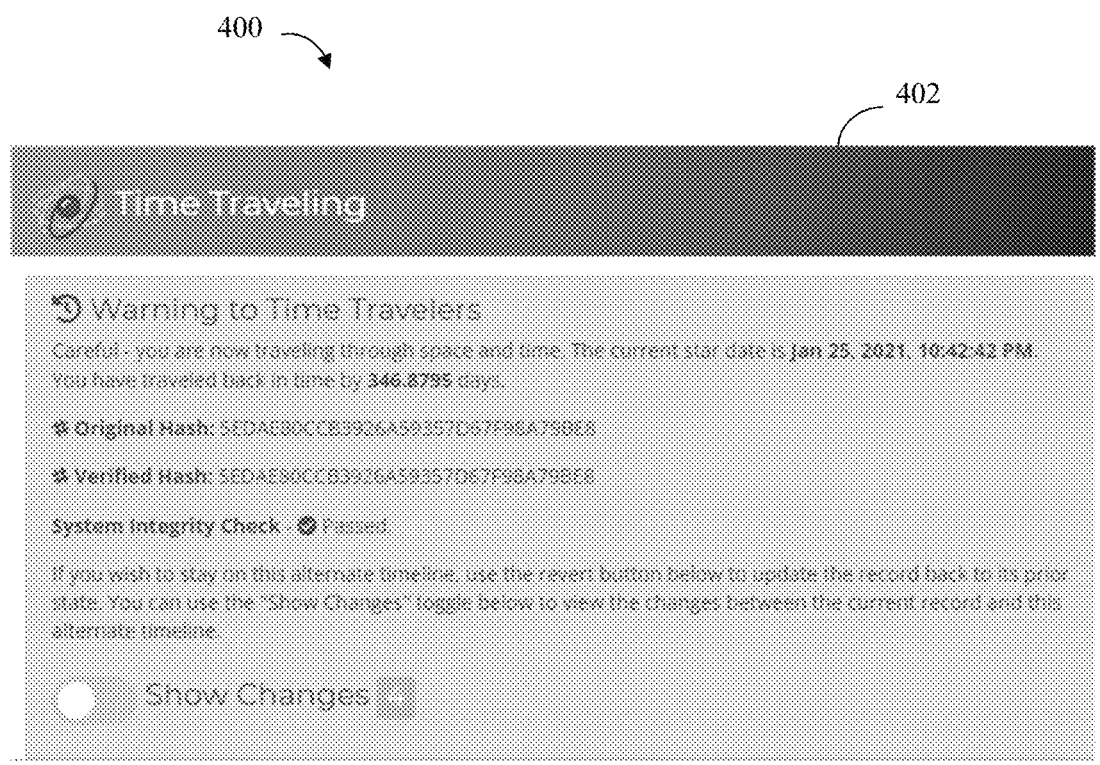
FIG. 4 illustrates a time travelling of a selected record, in accordance with an embodiment of the present subject matter.

Referring now to FIG. 4, a time travelling 400 of a selected record 402 is disclosed in accordance with an embodiment of the present subject matter. In one embodiment, the third time travel record 304 may be selected by the user. Further, the system 102 may generate the new hash. The new hash may be compared with an original hash of the third time travel record 302. Based on a matching comparison, the system 102 may check the integrity of the data of the third time travel record 302. Upon verifying the integrity, the time travelling 400 may be displayed to the user. The time travelling 400 may show the previous hash that indicates an original hash, the verified hash and a system integrity check as passed. In one aspect, the integrity check may provide an assurance that the digital object has not been altered in any way and that the sequence of the time stamps is valid. The integrity check may help to prevent fraud or evidence tampering to potentially avoid a fine during an audit scenario.

Figure 5:
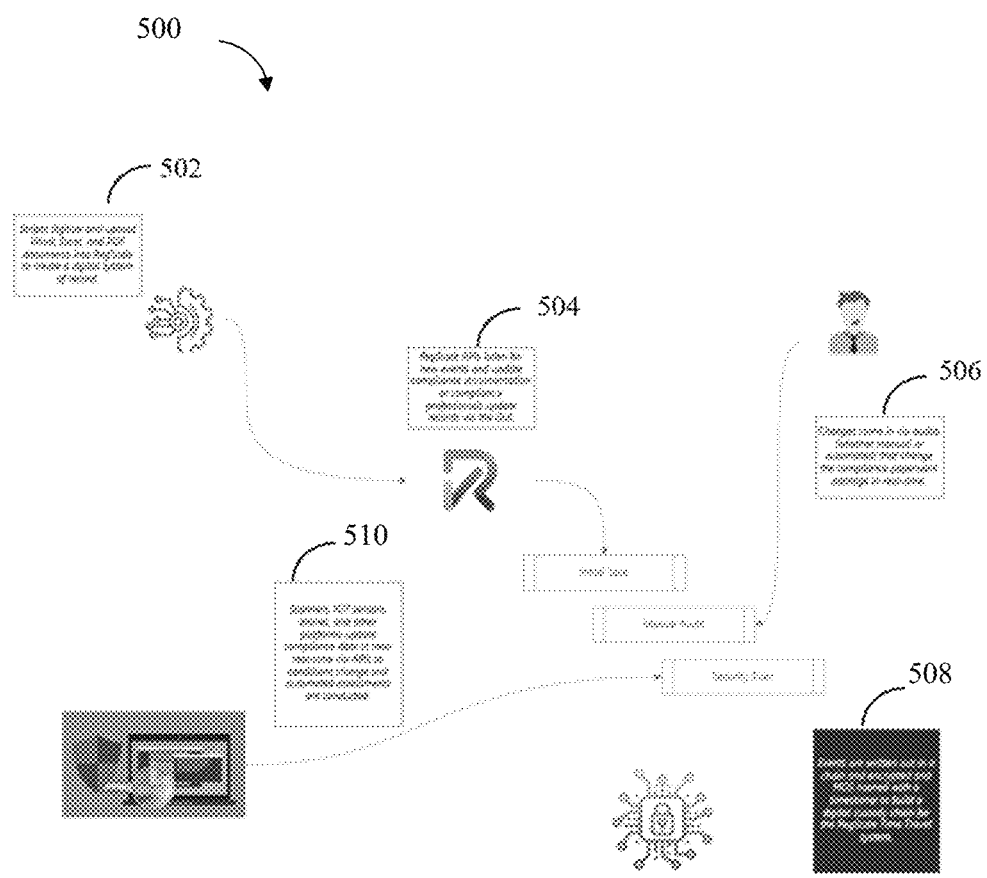
FIG. 5 illustrates a flow chart of the system for tracking history of a digital object in a cryptographic chain, in accordance with an embodiment of the present subject matter.

Referring now to FIG. 5, a flow chart 500 of the system 102 for tracking history of a digital object in a cryptographic chain is disclosed in accordance with an embodiment of the present subject matter. In one embodiment, at block 502, unstructured data such as word document, pdf document and excel document may be uploaded to the system 102. The unstructured data may be converted into a digital object. In one aspect, the unstructured data may be a compliance document. Further, the digital object may be time stamped, encrypted and hashed. Furthermore, a first time travel record associated with the digital object may be generated.

Further, at block 504, an update or a new event in the digital object may be received. In one example, the update or the new event may be received via a RegScale Application Programming Interfaces (APIs). In another example, the update or the new event may be entered via a Graphical User Interface (GUI) to a web form.

Furthermore, at block 506, the update in an audit may be received. The audit may be a manual audit or an automated audit. In one aspect, the update may make change to the compliance document in real-time.

Subsequently, at block 508, an updated digital object may be time stamped, encrypted and hashed. Further, a second time travel record associated with the updated digital object may be generated. The first time travel record and the second time travel record may be linked to form a cryptographic chain.

Further, at block 510, scanners, IOT platforms, drones and other platforms update the compliance document in real-time as conditions change and automated assessments are conducted. The system 102 may allow for a streaming machine to machine API interface where all changes or edits are written out as links in the cryptographic chain for discrete tracking.

Figure 6:
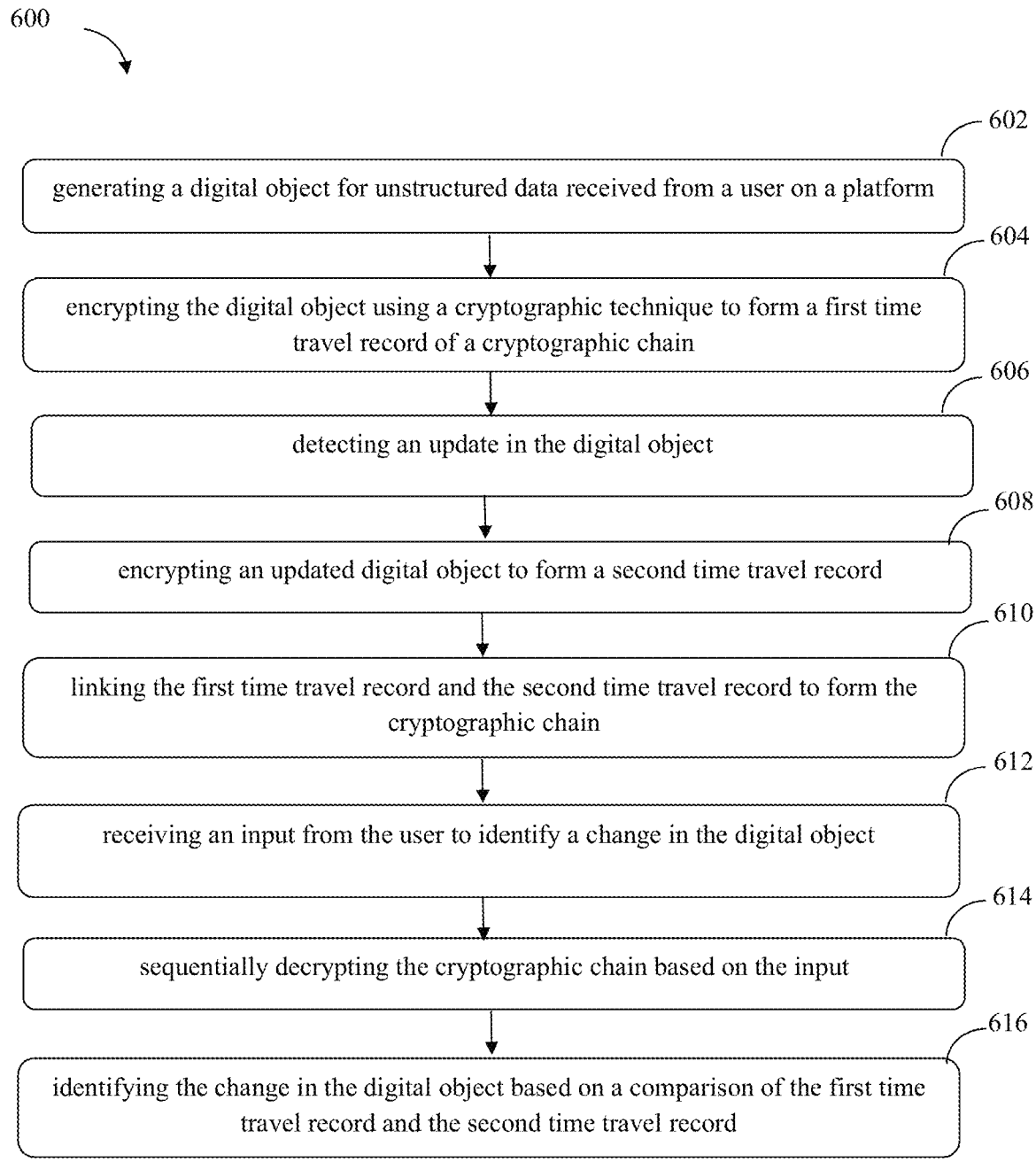
FIG. 6 illustrates a method for tracking history of a digital object in a cryptographic chain, in accordance with an embodiment of the present subject matter.

Referring now to FIG. 6, a method 600 for tracking history of a digital object using a cryptographic chain is shown, in accordance with an embodiment of the present subject matter. The method 600 may be described in the general context of computer executable instructions. Generally, computer executable instructions can include routines, programs, objects, components, data structures, procedures, modules, functions, etc., that perform particular functions or implement particular abstract data types.

The order in which the method 600 is described is not intended to be construed as a limitation, and any number of the described method blocks can be combined in any order to implement the method 600 or alternate methods for tracking history of a digital object using a cryptographic chain. Additionally, individual blocks may be deleted from the method 600 without departing from the spirit and scope of the subject matter described herein. Furthermore, the method 600 for tracking history of a digital object using a cryptographic chain can be implemented in any suitable hardware, software, firmware, or combination thereof. However, for ease of explanation, in the embodiments described below, the method 600 may be considered to be implemented in the above described system 102.

At block 602, a digital object may be generated for unstructured data or structured data received from a user on a platform.

At block 604, the digital object may be encrypted using a cryptographic technique to form a first time travel record of a cryptographic chain. In one aspect, the time travel record may comprise encrypted data, user information, and a timestamp of the digital object. The cryptographic chain may comprise a plurality of versions associated with the digital object over time as edits are performed.

At block 606, an update in the digital object may be detected. In one aspect, the update may be detected in real-time.

At block 608, an updated digital object may be encrypted to form a second time travel record. In one aspect, the encryption may be based on a composite key. The composite key may be dependent on a private key and a hash of a preceding record. The second time travel record may comprise encrypted data, user information, and a timestamp of the updated digital object.

At block 610, the first time travel record and the second time travel record may be linked to form the cryptographic chain. In one aspect, the cryptographic chain may indicate the full history of updates associated to the digital object.

At block 612, an input from the user may be received to identify a change in the digital object. In one aspect, the input may be received to decrypt the cryptographic chain to allow for a comparison of changes.

At block 614, the cryptographic chain may be sequentially decrypted based on the input. In one aspect, each time travel record present in the cryptographic chain may be decrypted using the unique composite key for the selected record which differs for each record based on its position in the chain due to a unique hash of each record before it.

At block 616, the change in the digital object may be identified based on a comparison of the first time travel record and the second time travel record, thereby tracking history of the digital object using the cryptographic chain.

Exemplary embodiments discussed above may provide certain advantages. Though not required to practice aspects of the disclosure, these advantages may include those provided by the following features.

Some embodiments of the system and the method comprises a digitization engine to make unstructured data machine readable while providing encryption mechanisms that ensure confidentiality.

Some embodiments of the system and the method comprise cryptography and hashing to ensure integrity of data in a cryptographic chain.

Some embodiments of the system and the method enable tracking changes in a digital object in real-time to allow version comparisons at the field level.

Some embodiments of the system and the method ensures integrity of every update in the system using cryptography while validating proper sequencing of time stamps to verify the integrity of the cryptographic chain.

Some embodiments of the system and the method provides a cryptographic chain indicating history of updates associated to a digital object where the order of events and timeline cannot be changed without breaking the cryptographic chain and hashing comparisons to ensure the integrity of the system.

Although implementations for methods and system for tracking history of a digital object using a cryptographic chain have been described in language specific to structural features and/or methods, it is to be understood that the appended claims are not necessarily limited to the specific features or methods described. Rather, the specific features and methods are disclosed as examples of implementations for tracking history of a digital object using a cryptographic chain.

The invention claimed is:

1. A method for tracking a history of a digital object using a cryptographic chain, the method comprising:
   generating, by a processor, a digital object for unstructured data or structured data received from a user on a platform;
   encrypting, by the processor, the digital object using a cryptographic technique to form a first time travel record of a cryptographic chain, wherein the first time travel record comprises encrypted data, user information, and a timestamp of the digital object, and wherein the cryptographic chain comprises a plurality of versions associated with the digital object;
   detecting, by the processor, an update in the digital object to generate an updated digital object, wherein the update is detected in real-time;
   encrypting, by the processor, the updated digital object to form a second time travel record, wherein the encryption forming the second time travel record is based on a composite key, and wherein the composite key is dependent on a private key and a hash of a preceding record, and wherein the second time travel record comprises encrypted data, user information, and a timestamp of the updated digital object;
   linking, by the processor, the first time travel record and the second time travel record to form the cryptographic chain, wherein the cryptographic chain indicates a history of updates associated to the digital object;
   receiving, by the processor, an input to select a time travel record from the cryptographic chain, and to decrypt the selected time travel record from the cryptographic chain;
   sequentially decrypting, by the processor, the cryptographic chain based on the input, wherein each time travel record present in the cryptographic chain is sequentially decrypted using the composite key, and wherein the sequential decryption is in a reverse chronological order until reaching the selected time travel record in the cryptographic chain;
   identifying, by the processor, a change in the digital object based on a comparison of the first time travel record and the second time travel record; and
   displaying, by the processor, the change in multiple tabs, wherein the multiple tabs comprise a before change tab and an after change tab, and wherein the before change tab shows data of the digital object, and the after change tab shows the data of the updated digital object, and wherein the before change tab and the after change tab show discrete changes between different versions of the digital object to know precisely which fields on the digital object are changed, thereby tracking the history of the digital object using the cryptographic chain.

2. The method as claimed in claim 1, wherein the unstructured data is one of a word document, an excel document, a PDF document and a website, wherein the structured data comprises JSON, HTML, YAML, or XML formats.

3. The method as claimed in claim 1, wherein encrypting the digital object comprises:
   converting, by the processor, the digital object into a predefined format, wherein the predefined text format is one of a JSON format, YAML, an HTML format and an XML format;
   creating, by the processor, a first hash for the predefined format using a hashing technique;
   generating, by the processor, the first time travel record of the digital object based on the first hash, wherein the first time travel record is generated based on a snapshot of the digital object, thereby encrypting the first time travel record.

4. The method as claimed in claim 1, wherein the encryption of the updated digital object comprises:
   recording, by the processor, an updated format of the updated digital object upon detecting the update;
   generating, by the processor, a composite key for the updated format, wherein the composite key is generated based on a private key and a hash of a preceding record;
   creating, by the processor, an updated hash for the updated digital object using a hashing technique; and
   generating, by the processor, the second time travel record based on the updated hash, wherein the second time travel record is generated based on a snapshot of the updated digital object, thereby encrypting the second time travel record.

5. The method as claimed in claim 1, wherein the first decryption comprises:
   generating, by the processor, a new hash for the selected time travel record upon receiving the input;
   comparing, by the processor, the new hash with an updated hash, wherein the comparison is configured to check integrity of data associated with the updated digital object; and
   decrypting, by the processor, the selected record upon comparison of the new hash and the updated hash, wherein the decryption of the selected time travel record upon comparison of the new hash and the updated hash is based on the composite key of the selected record, and wherein the decryption of the selected time travel record upon comparison of the new hash and the updated hash comprises sequential decryption of the cryptographic chain.

6. The method as claimed in claim 1, comprises travelling from the timestamp of the first time travel record to the timestamp of the second time travel record.

7. A system for tracking a history of a digital object using a cryptographic chain, the system comprising:
   a memory;
   a processor coupled to the memory, wherein the processor is configured to execute a set of instructions stored in the memory to:
   generate a digital object for unstructured data received from a user on a platform;
   encrypt the digital object using a cryptographic technique to form a first time travel record of a cryptographic chain, wherein first the time travel record comprises encrypted data, user information and a timestamp of the digital object, and wherein the cryptographic chain comprises a plurality of versions associated with the digital object;

detect an update in the digital object to generate an updated digital object, wherein the update is detected in real-time;

encrypt the updated digital object to form a second time travel record, wherein the encryption of the updated digital object to form the second time travel record is based on a composite key, and wherein the composite key is dependent on a private key and a hash of a preceding record, and wherein the second time travel record comprises encrypted data, user information and a timestamp of the updated digital object;

link the first time travel record and the second time travel record to form the cryptographic chain, wherein the cryptographic chain indicates a history of updates associated to the digital object;

receive an input to select a time travel record from the cryptographic chain, and decrypt the selected time travel record from the cryptographic chain;

sequentially decrypt the cryptographic chain based on the input, wherein each time travel record present in the cryptographic chain is sequentially decrypted using the composite key, and wherein the sequential decryption is in a reverse chronological order until reaching the selected time travel record in the cryptographic chain;

identify a change in the digital object based on a comparison of the first time travel record and the second time travel record; and displaying, by the processor, the change in multiple tabs, wherein the multiple tabs comprise a before change tab and an after change tab, and wherein the before change tab shows data of the digital object, and the after change tab shows the data of the updated digital object, and wherein the before change tab and the after change tab show discrete changes between different versions of the digital object to know precisely which fields on the digital object are changed, thereby tracking the history of the digital object using the cryptographic chain.

8. The system as claimed in claim 7, wherein the unstructured data is one of a word document, an excel document, a PDF document and a website, and wherein the structured data comprises JSON, HTML, YAML, or XML formats.

9. The system as claimed in claim 7, wherein encrypting the digital object comprises:
   converting, by the processor, the digital object into a predefined format, wherein the predefined text format is one of a JSON format, an HTML format, YAML format, and an XML format;
   creating, by the processor, a first hash for the predefined format using a hashing technique;
   generating, by the processor, the first time travel record of the digital object based on the first hash, wherein the first time travel record is generated based on a snapshot of the digital object, thereby encrypting the first time travel record.

10. The system as claimed in claim 7, wherein the encryption of the updated digital object comprises:
   recording, by the processor, an updated format of the updated digital object upon detecting the update;
   generating, by the processor, a composite key for the updated format, wherein the composite key is generated based on a private key and a hash of a preceding record;
   creating, by the processor, an updated hash for the updated digital object using the hashing technique; and
   generating, by the processor, the second time travel record based on the updated hash, wherein the second time travel record is generated based on a snapshot of the updated digital object, thereby encrypting the second time travel record.

11. The system as claimed in claim 7, wherein the first decryption comprises: generating, by the processor, a new hash for the selected time travel record upon receiving the input;
   comparing, by the processor, the new hash with an updated hash, wherein the comparison is configured to check integrity of data associated with the updated digital object; and
   decrypting, by the processor, the selected record upon comparison of the new hash and the updated hash, wherein the decryption of the selected time travel record upon comparison of the new hash and the updated hash is based on the composite key of the selected record, and wherein the decryption of the selected time travel record upon comparison of the new hash and the updated hash comprises sequential decryption of the cryptographic chain.

12. The system as claimed in claim 7, configured to travel from the timestamp of the first time travel record to the timestamp of the second time travel record.

13. A non-transitory computer program product having embodied thereon a computer program for tracking a history of a digital object using a cryptographic chain, the computer program product storing instructions, the instructions comprising instructions for:
   generating a digital object for unstructured data received from a user on a platform;
   encrypting the digital object using a cryptographic technique to form a first time travel record of a cryptographic chain, wherein the first time travel record comprises encrypted data, user information and a timestamp of the digital object, and wherein the cryptographic chain comprises a plurality of versions associated with the digital object;
   detecting an update in the digital object to generate an updated digital object, wherein the update is detected in real-time;
   encrypting an updated digital object to form a second time travel record, wherein the encryption forming the second time travel record is based on a composite key, and wherein the composite key is dependent on a private key and a hash of a preceding record, and wherein the second time travel record comprises encrypted data, user information, and a timestamp of the updated digital object;
   linking the first time travel record and the second time travel record to form the cryptographic chain, wherein the cryptographic chain indicates the history of updates associated to the digital object;
   receiving an input to select a time travel record from the cryptographic chain, and decrypt the selected time travel record from the cryptographic chain;
   sequentially decrypting the cryptographic chain based on the input, wherein each time travel record present in the cryptographic chain is sequentially decrypted using the composite key, and wherein the sequential decryption is in a reverse chronological order until reaching the selected record in the cryptographic chain;
   identifying a change in the digital object based on a comparison of the first time travel record and the second time travel record; and
   displaying, by the processor, the change in multiple tabs, wherein the multiple tabs comprise a before change tab and an after change tab, and wherein the before change tab shows data of the digital object, and the after change tab shows the data of the updated digital object, and wherein the before change tab and the after change tab show discrete changes between different versions of the digital object to know precisely which fields on the digital object are changed, thereby tracking the history of the digital object using the cryptographic chain.

\* \* \* \* \*